US008522335B2

(12) United States Patent
Lawrence et al.

(10) Patent No.: US 8,522,335 B2
(45) Date of Patent: Aug. 27, 2013

(54) TOKEN MEDIATION SERVICE IN A DATA MANAGEMENT SYSTEM

(75) Inventors: Calvin D Lawrence, Atlanta, GA (US); Miguel A Ortiz, Austin, TX (US); Patrick Ryan Wardrop, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 873 days.

(21) Appl. No.: 12/628,477

(22) Filed: Dec. 1, 2009

(65) Prior Publication Data

US 2011/0131643 A1    Jun. 2, 2011

(51) Int. Cl.
*H04L 29/06*    (2006.01)

(52) U.S. Cl.
USPC .......................................................... 726/10

(58) Field of Classification Search
None
See application file for complete search history.

(56) References Cited

U.S. PATENT DOCUMENTS

| | | | | |
|---|---|---|---|---|
| 6,311,269 | B2 * | 10/2001 | Luckenbaugh et al. | 713/154 |
| 6,965,939 | B2 * | 11/2005 | Cuomo et al. | 709/229 |
| 7,085,840 | B2 * | 8/2006 | de Jong et al. | 709/229 |
| 7,178,163 | B2 * | 2/2007 | Reeves, Jr. | 726/2 |
| 7,219,154 | B2 * | 5/2007 | Blakley et al. | 709/229 |
| 7,669,054 | B2 * | 2/2010 | Fox | 713/172 |
| 7,748,046 | B2 * | 6/2010 | Johnson et al. | 726/27 |
| 8,181,225 | B2 * | 5/2012 | Hinton et al. | 726/2 |
| 2002/0091757 | A1 * | 7/2002 | Cuomo et al. | 709/203 |
| 2003/0084170 | A1 * | 5/2003 | de Jong et al. | 709/229 |
| 2003/0084171 | A1 * | 5/2003 | de Jong et al. | 709/229 |
| 2003/0226036 | A1 * | 12/2003 | Bivens et al. | 713/201 |
| 2004/0093515 | A1 * | 5/2004 | Reeves, Jr. | 713/201 |
| 2004/0128393 | A1 * | 7/2004 | Blakley et al. | 709/229 |
| 2004/0260953 | A1 | 12/2004 | Jamieson et al. | |
| 2005/0044393 | A1 | 2/2005 | Holdsworth | |
| 2005/0138421 | A1 | 6/2005 | Fedronic et al. | |
| 2006/0248598 | A1 * | 11/2006 | Johnson et al. | 726/27 |
| 2007/0005956 | A1 | 1/2007 | Zilinskas et al. | |
| 2007/0033148 | A1 | 2/2007 | Cahill | |
| 2007/0043954 | A1 * | 2/2007 | Fox | 713/185 |
| 2007/0186106 | A1 | 8/2007 | Ting et al. | |
| 2008/0046715 | A1 * | 2/2008 | Balazs et al. | 713/152 |
| 2008/0046984 | A1 * | 2/2008 | Bohmer et al. | 726/5 |
| 2009/0187975 | A1 | 7/2009 | Edwards, Jr. et al. | |
| 2009/0205032 | A1 * | 8/2009 | Hinton et al. | 726/7 |
| 2009/0259753 | A1 * | 10/2009 | Hinton et al. | 709/226 |
| 2010/0083359 | A1 * | 4/2010 | Readshaw et al. | 726/7 |
| 2010/0250955 | A1 * | 9/2010 | Trevithick et al. | 713/185 |

* cited by examiner

*Primary Examiner* — Oscar Louie
(74) *Attorney, Agent, or Firm* — Elissa Y. Wang; Edell, Shapiro & Finnan, LLC

(57) ABSTRACT

A method and system for mediating security tokens to authorization data transactions in a data management system. The methods and systems intercept a data request between two applications or services, and validate and translate a security token sent with the data request from a format compatible with the first application or service to a format compatible with the second application or service.

18 Claims, 3 Drawing Sheets

TOKEN MEDIATION SERVICE IN A DATA MANAGEMENT SYSTEM

BACKGROUND

1. Technical Field

The present invention relates generally to a token mediation service, and more particularly to systems and methods for using a token mediation service and security tokens to authorize database transactions in a data management system.

2. Discussion of Related Art

Enterprises generally desire to provide authorized users with secure access to protected resources in a user-friendly manner throughout a variety of networks, including the Internet. Although providing secure authentication mechanisms reduces the risks of unauthorized access to protected resources, those authentication mechanisms may become barriers to accessing protected resources.

Users generally desire the ability to change from interacting with one application to another application without regard to authentication barriers that protect each particular system supporting those applications. A user might assume that once he or she has been authenticated by some computer system, the authentication should be valid throughout the user's working session, or at least for a particular period of time, without regard to the various computer architecture boundaries that are almost invisible to the user. Subjecting a user to multiple authentication processes in a given time frame may significantly affect the user's efficiency.

Moreover, maintaining different authorization and authentication credentials, and requiring each application to obtain or validated security credentials for each access by a user slows down network speed, increases network traffic, and requires maintenance by the system administrator, thus significantly affecting the network's efficiency. Further, point-to-point authentication is inefficient and slows down execution of a data request.

BRIEF SUMMARY

Accordingly, embodiments of the present invention include a method of processing a query, comprising receiving a data request from a first application that is directed to a second application, receiving a first token in a first credential format from the first application, validating the first token, issuing a second token in a second credential format compatible with the second application by translating the first token into a second credential format, and sending the data request and the second token to the second application.

Other embodiments of the present invention include a computer program product comprising a computer useable medium having a computer readable program, where the computer readable program when executed on a computer causes the computer to receive a data request from a first application that is directed to a second application, receive a first token in a first credential format from the first application, validate the first token, issue a second token in a second credential format compatible with the second application by translating the first token into a second credential format, and send the data request and the second token to the second application.

Still other embodiments of the present invention include a system comprising a memory having validation information stored therein, and a processor configured with logic to receive a data request from a first application that is directed to a second application, receive a first token in a first credential format from the first application, validate the first token, issue a second token in a second credential format compatible with the second application by translating the first token into a second credential format, and send the data request and the second token to the second application.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

Figure 1:
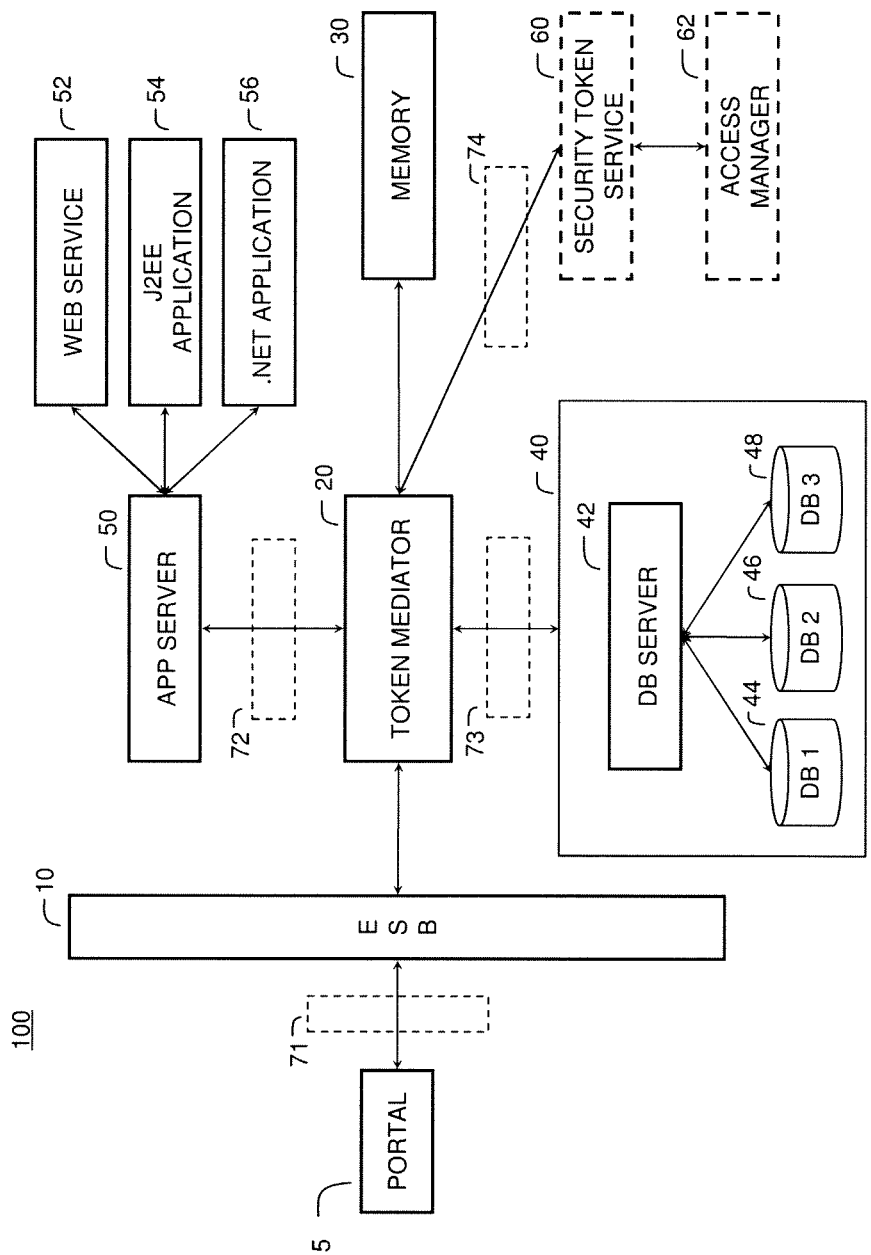
FIG. 1 is a block diagram illustrating an exemplary token mediation service used in a data management system according to an embodiment of the present invention.

Referring now to the Figures, an exemplary system according to an embodiment of the present invention is illustrated in FIG. 1. The system shown in FIG. 1 is particularly suited to the mediation of security tokens in a data management system, for example a federated data management system. The system includes token mediator module 20, memory 30, database management system (DBMS) 40, application server 50, and security token service 60, all of which are connected over networks 71, 72, 73, 74 to each other and via Enterprise Service Bus (ESB) layer 10 to a user portal 5. The system 100 may include additional servers, clients, and other devices not shown, and individual components of the system may occur either singly or in multiples, for example, there may be more than one DBMS in the system.

Generally, the user portal 5 provides an interface to the functions provided by the token mediator module 20, DBMS 40, and application server 50, for example, mechanisms for querying the databases in the DBMS 40, etc. The user portal 5 may be implemented by any quantity of conventional or other computer systems or devices (e.g., computer terminals, personal computers (e.g., IBM-compatible, Apple MacIntosh, tablet, laptop, etc.), cellular telephone, personal data assistant (e.g., Palm Pre, Treo, iPhone, etc.), and may include any commercially available operating system (e.g., AIX, Linux, OSX, Sun Solaris, Unix, Windows, etc.) and any commercially available or custom software (e.g., browser software, communications software, word processing software, etc.). These systems may include types of displays and input devices (e.g., keyboard, mouse, voice recognition, etc.) to enter and/or view information.

The token mediator module 20 may be implemented in the form of a processing system, or may be in the form of software. A processing system may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). If embodied in software, the token mediator module 20 may be available on a recordable medium (e.g., magnetic, optical, floppy, DVD, CD, etc.) or in the form of a carrier wave or signal for downloading from a source via a communication medium (e.g., bulletin board, network, LAN, WAN, Intranet, Internet, etc.). For example, the token mediator module 20 can be implemented as software, for example one or more daemons, software modules, or APIs.

Memory 30 may be implemented by any conventional or other memory or storage device (e.g., RAM, cache, flash, etc.), and may include any suitable storage capacity.

The DBMS 40 may be any suitable database management system, e.g., a DB2 Data Warehouse, and may be a Master Data Management system such as IBM InfoSphere Master Data Management Server, Microsoft SQL Server 2008 R2 Master Data Services, or Sun Master Data Management (MDM) Suite, for example. In the depicted embodiment, the DBMS comprises database server 42 and databases 44, 46, 48, which represent any quantity of any type of conventional or other databases (e.g., network, hierarchical, relational, object, etc.) or storage structures (e.g., files, data structures, web-based storage, disk or other storage, etc.). The databases or storage structures 44, 46, 48 may store any desired information arranged in any fashion (e.g., tables, hierarchical, relations, objects, etc.), and may store additional information such as metadata in addition to documents. For example, the databases or storage structures 44, 46, 48 may be any suitable data storage structure such as an enterprise data source (e.g., DB2, Oracle, IBM Enterprise Content Management (ECM) systems, ERP systems, etc.), personal and intra-organization data sources (e.g., spreadsheets (e.g., Microsoft Excel)), databases (e.g., Microsoft Access, MySQL), Sharepoint, Quickr, XML, etc.), or web-based data sources such as public databases (e.g., tax records, real estate records, court documents, etc.) and the like.

Application server 50 may be any suitable application server, and may comprise multiple applications to which it manages access, for example an application web service 52, a J2EE application 54, and a .NET application 56. Any suitable application server may be used, for example IBM WebSphere Application Server, JBoss Application Server, Microsoft Windows Server with .NET Framework, Oracle WebLogic Server, Sun GlassFish Enterprise Server, etc.

Security token service 60 provides token issuance and validation services required by the token mediator module 20, either alone or in combination with access manager 62. The security token service 60 invokes the access manager 62 as necessary, for example to consult an access control list to determine if a user is authorized access to a particular application or database, for example publication access or subscription access. In certain embodiments, for example embodiments used in a federated computing environment, the security token service 60 may be implemented using IBM Tivoli Federated Identity Manager, and the access manager 62 may be implemented using IBM Tivoli Access Manager.

The networks 71, 72, 73, 74 may be implemented by any quantity of any suitable communications media (e.g., WAN, LAN, Internet, Intranet, wired, wireless, etc.). The computer systems of the present invention embodiments may include any conventional or other communications devices to communicate over the networks via any conventional or other protocols, and may utilize any type of connection (e.g., wired, wireless, etc.) for access to the network. It is understood that any of the user portal 5, token mediator module 20, memory 30, DBMS 40, and application server 50 may be local to one or more components of system 100, or may be remote from and in communication with one or more other components of system 100 via one or more networks 71, 72, 73, 74.

For purposes of illustration, FIG. 1 depicts the token mediator module 20, database server 42 and application server 50 as entities separate and distinct from each other. It is understood that the module 20 and servers 42 and 50 may also be implemented, for example, on a single server (e.g., as logically distinct modules), distributed on portions of several servers, or as part of a single server node or server farm in communication with the system 100 through, for example, a web server.

In operation, the token mediator module 20 provides a way to implement security policies and access control in a single module as opposed to being spread across the entire data management system. When a user requests access to a database or application, the token mediator module 20 intercepts the request and the authentication criteria supplied by the user, and adjudicates the access request itself (either alone or in combination with security token service 60 and/or access manager 62) based on access rules or policies stored in memory 30.

Figure 2:
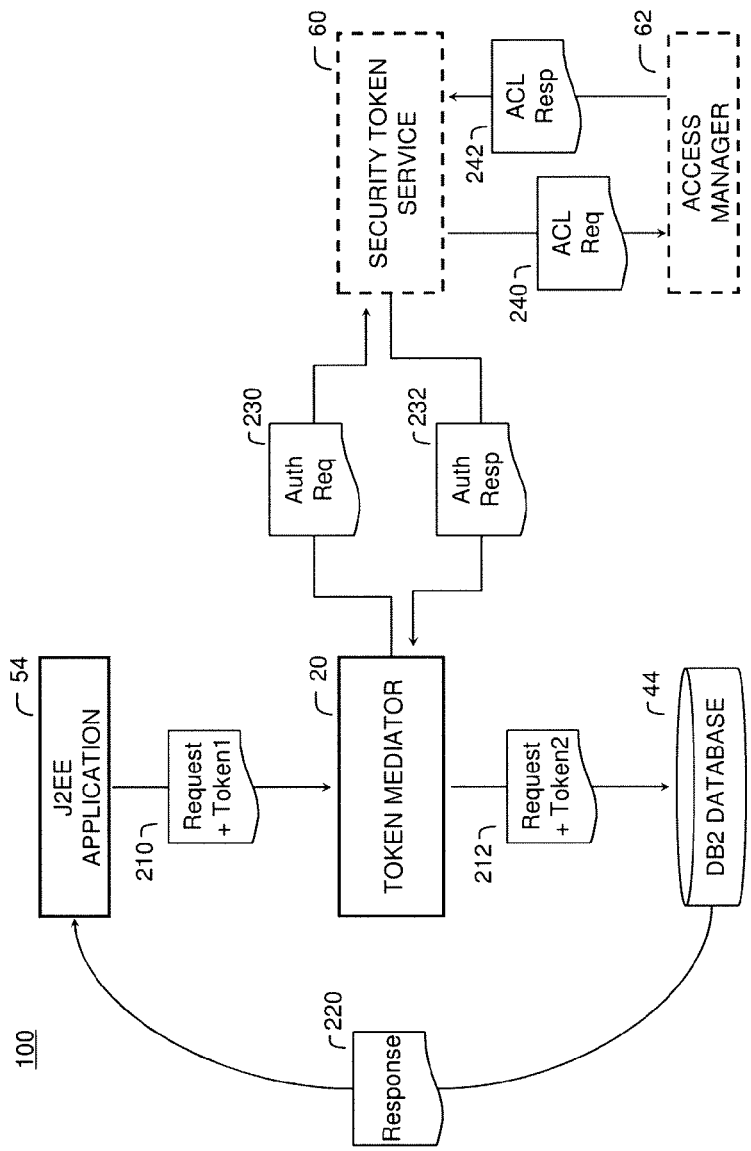
FIG. 2 is a block diagram illustrating the flow of data requests and tokens in a data management system according to an embodiment of the present invention.

Referring now to FIG. 2, a simplified version of system 100 is depicted, showing only the elements involved in a particular data transaction. In this embodiment, a J2EE application 54 makes a data request 210 to a DB2 database 44 requesting a response, and with the request includes a first token (Token 1) in a first credential format, such as LTPA, SAML 1.0, or the like. This data request 210 is intercepted by the token mediator module 20, which then adjudicates the data request by validating the first token, translating the first token (if valid) into a second credential format, such as SAML 2.0, a WS-Trust format, or the like, and issuing a second token (Token 2) in the second credential format. The token mediator module 20 then sends a data request 212 to the DB2 database 44, and with the request includes the second token (Token 2). The DB2 database 44 receives the data request 212 and the second token, processes the request according to the received authorization (in the form of the token), and sends a response 220 back to the requesting application 54.

As used herein, the terms "request" and "response" should be understood to comprise data formatting that is appropriate for the transfer of information that is involved in a particular operation, such as messages, communication protocol information, or other associated information. The first and second credential formats can be any suitable credential format, for example, challenge/response information, Kerberos, Liberty, PKI certificates, Security Assertion Markup Language (SAML) versions such as 1.0 and 2.0, user name and password combinations, Web Services Federation (WS-Federation), WS-Security, WS-Trust, a XML credential standard, etc. The term "token" is used herein to refer to a particular set of credentials, however it is understood that this term refers to any suitable set of credentials, for example a WS-Federation token, a SAML assertion, a PKI certificate, etc.

Although described in terms of an application passing a request to a database, it is understood that the token mediator module 20 provides full bi-directional service, and that a database may pass a request to an application or service, or vice-versa, and that a request need not originate from a J2EE application, .NET application, Java service, or any other specific module in the system.

Optionally, the token mediator module 20 may perform an authorization against the security token service 60, for example by sending an authorization request 230 to the security token service 60, and receiving in response an authorization response 232. The security token service 60 may also perform an authorization against the access manager 62, for example by sending a request 240 to consult an access control list to the access manager 62, and receiving a response 242 after the access manager 62 has consulted the appropriate access control list.

Figure 3:
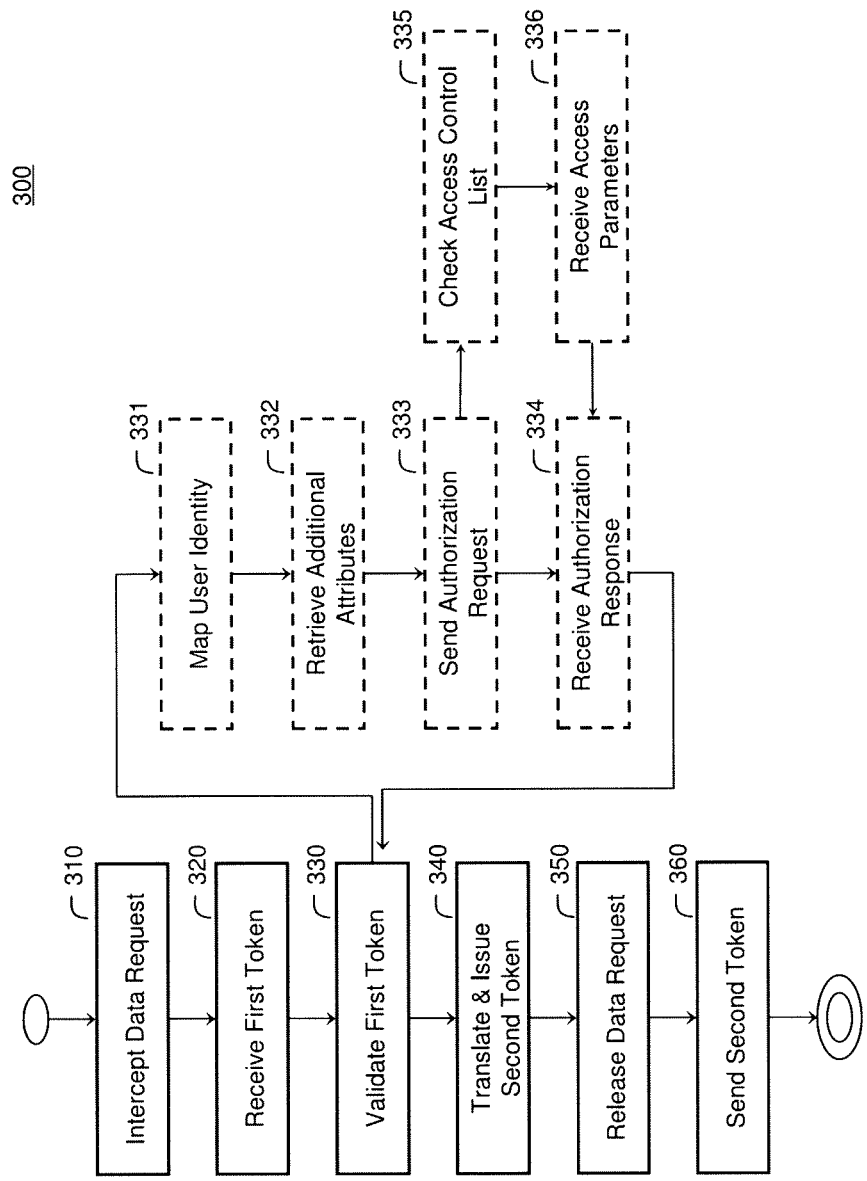
FIG. 3 is a flowchart depicting a process for requesting, validating and issuing security tokens in a token mediation service in a data management system according to an embodiment of the present invention.

Generally, the token mediator module 20 that has been previously described performs the steps of FIG. 3. Referring now to FIG. 3, the reference numeral 300 generally designates a flow chart depicting a process for mediating security tokens in a data management system. In step 310, the token mediator module intercepts a data request from a first application to a second application, and in step 320, the module receives a first token in a first credential format (e.g., an LTPA token) from the first application. In step 330, the module validates the first token by consulting validation information, for example validation information stored in a validation or authorization database or server, and in step 340 translates the validated first token into a second token in a second credential format (e.g., a SAML 2.0 assertion), and issues the second token. In step 350, the module releases the data request to the second application (for example by releasing the intercepted data request and replacing the first token therein with the second token, sending a new data request incorporating relevant portions of the intercepted data request along with the second token, etc.), and in step 360 the module sends the second token to the second application.

Optionally, the module may perform additional steps as part of the validation and translation process, for example in step 331 the module maps the user identity, and in step 332 the module retrieves additional attributes for the identity. The module may also perform optional step 333 in which it sends an authorization request, and step 334 in which it receives an authorization response, if further authorization is desired, for example against an authorization server and/or access manager, such as IBM Tivoli Federated Identity Manager, IBM Tivoli Access Manager, or the like. Additionally, the module may perform optional step 335 in which it checks (or requests an authorization server to check) an access control list to consult the access control settings or permissions for the requested application or service, and optional step 336 in which it receives access parameters for the requested application or service.

The first token may be pre-existing, or may be obtained from an authentication engine appropriate for the first application's security domain, e.g., a Java Authentication and Authorization Service authentication engine or Tivoli Access Manager Authorization Server for a Java security domain.

Advantages of the methods and systems using the token mediator module embodiments described herein include the ability to support a variety of credentials and asserts (whether standard or custom), the elimination of inefficient point-to-point communication between the token provider and token consumers, removal of multiple hops required to obtain and pass tokens, and true abstract mediation of tokens at runtime, all in a secure and scalable manner. The token mediator module may sit on top of pluggable authentication modules to provide true hub-and-spoke round-trip authentication, mapping and routing services. Further, as evident from the preceding discussion, the token mediator module does not require any support from the system passing the request (e.g., the application server) or the system that consumes the request (e.g., the database system).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It is to be understood that the software for the computer systems of the present invention embodiments may be implemented in any desired computer language and could be developed by one of ordinary skill in the computer arts based on the functional descriptions contained in the specification and flow charts illustrated in the drawings. By way of example only, the software may be implemented in the C#, C++, Python, Java, or PHP programming languages. Further, any references herein of software performing various functions generally refer to computer systems or processors performing those functions under software control.

The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operation steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the system to become coupled to other processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, method and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometime be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of processing a query, comprising:
   receiving at a token mediator a data request from a first application that is directed to a second application;
   receiving at the token mediator a first token in a first credential format from the first application and storing the first token in a memory device;
   validating the stored first token by performing an authentication check that the first application is authorized to access the second application against an authentication server;
   issuing a second token in a second credential format compatible with the second application by translating the stored first token into a second credential format, wherein if the first application is authorized then the second token indicates such authorization, and wherein if the first application is not authorized then the second token indicates such lack of authorization; and
   sending the data request and the second token from the token mediator to the second application.

2. The method of claim 1, wherein the first and second credential formats are different, and are individually selected from the group consisting of Kerberos, Liberty, Security Assertion Markup Language (SAML), Web Services Federation (WS-Federation), Web Services Security (WS-Security), and Web Services Trust (WS-Trust).

3. The method of claim 1, wherein the first credential format and the second credential format are different XML credential standards.

4. The method of claim 1, further comprising:
mapping a user identity for a user of the first application.

5. The method of claim 4, further comprising:
retrieving attributes of the user identity from an authentication server.

6. The method according to claim 1, wherein at least one of the steps is implemented on a computer system.

7. A computer program product comprising a computer useable memory device having a computer readable program stored thereon, wherein the computer readable program when executed on a computer causes the computer to:
receive at a token mediator a data request from a first application that is directed to a second application;
receive at the token mediator a first token in a first credential format from the first application and store the first token in a memory device;
validate the stored first token by performing an authentication check that the first application is authorized to access the second application against an authentication server;
issue a second token in a second credential format compatible with the second application by translating the stored first token into a second credential format, wherein if the first application is authorized then the second token indicates such authorization, and wherein if the first application is not authorized then the second token indicates such lack of authorization; and
send the data request and the second token from the token mediator to the second application.

8. The computer program product of claim 7, wherein the first and second credential formats are different, and are individually selected from the group consisting of Kerberos, Liberty, Security Assertion Markup Language (SAML), Web Services Federation (WS-Federation), Web Services Security (WS-Security), and Web Services Trust (WS-Trust).

9. The computer program product of claim 7, wherein the first credential format and the second credential format are different XML credential standards.

10. The computer program product of claim 7, wherein the computer readable program when executed on a computer further causes the computer to:
map a user identity for a user of the first application.

11. The computer program product of claim 7, wherein the computer readable program when executed on a computer further causes the computer to:
retrieve attributes of the user identity from an authentication server.

12. The computer program product of claim 7, wherein the computer useable memory device is a computer useable optical storage medium.

13. The computer program product of claim 7, wherein the computer useable memory device is a hard disk.

14. A system comprising:
a memory having validation information stored therein; and
a processor configured with logic to:
receive at a token mediator a data request from a first application that is directed to a second application;
receive at the token mediator a first token in a first credential format from the first application and store the first token in the memory;
validate the stored first token by performing an authentication check that the first application is authorized to access the second application against an authentication server;
issue a second token in a second credential format compatible with the second application by translating the stored first token into a second credential format, wherein if the first application is authorized then the second token indicates such authorization, and wherein if the first application is not authorized then the second token indicates such lack of authorization; and
send the data request and the second token from the token mediator to the second application.

15. The system of claim 14, wherein the first and second credential formats are different, and are individually selected from the group consisting of Kerberos, Liberty, Security Assertion Markup Language (SAML), Web Services Federation (WS-Federation), Web Services Security (WS-Security), and Web Services Trust (WS-Trust).

16. The system of claim 14, wherein the first credential format and the second credential format are different XML credential standards.

17. The system of claim 14, the processor being further configured with the logic to:
map a user identity for a user of the first application.

18. The system of claim 17, the processor being further configured with the logic to:
retrieve attributes of the user identity from an authentication server.

* * * * *